United States Patent [19]

Cadorin

[11] Patent Number: 4,674,381
[45] Date of Patent: Jun. 23, 1987

[54] MOTORIZED SCROLL SAW

[76] Inventor: Gino Cadorin, 132 Ontario Street, Guelph, Ontario, N1E 3B4, Canada

[21] Appl. No.: 860,334

[22] Filed: May 7, 1986

[51] Int. Cl.⁴ .............................................. B27B 19/02
[52] U.S. Cl. ...................................... 83/752; 83/786; 83/578; 83/662; 83/698
[58] Field of Search .................... 83/752, 783–786, 83/572, 573, 662, 698

[56] References Cited

U.S. PATENT DOCUMENTS

| | | |
|---|---|---|
| 32,507 | 6/1861 | Barraud . |
| 123,211 | 1/1872 | Weaver . |
| 273,361 | 3/1883 | Hinkley . |
| 332,391 | 12/1885 | Goodell . |
| 1,467,720 | 9/1923 | Field ................................ 83/785 X |
| 2,540,227 | 2/1951 | Aberle . |
| 2,721,587 | 10/1955 | Dremel . |
| 3,169,433 | 2/1965 | Stockard ............................... 83/524 |

Primary Examiner—James M. Meister
Attorney, Agent, or Firm—Anthony Asquith & Co.

[57] ABSTRACT

The scroll-saw disclosed is constructed so as to make the task of clamping and un-clamping the saw-blade very simple and very quick. The quick-change facility makes it possible for a craftsman to contemplate cutting intricate designs having myriads of internal shapes. The electric motor of the scroll-saw is connected to the blade by means of a clutch. The clutch is operated by a foot-pedal. The blade is kept in constant tension by a spring. The scroll-saw includes a shoe, which is guided from up/down movement—when up, the shoe is clear of the blade—when down, the shoe comes into contact with the blade, and allows the blade to be de-tensioned. Thus, the blade can be un-clamped, and moved to the next internal shape to be cut, while the vertical position of the blade is controlled by the shoe. The movement of the shoe also is controlled by the foot-pedal. The operation of the foot-pedal is such that the first part of the pedal movement disengages the clutch, and the later part of the movement operates the shoe.

6 Claims, 3 Drawing Figures

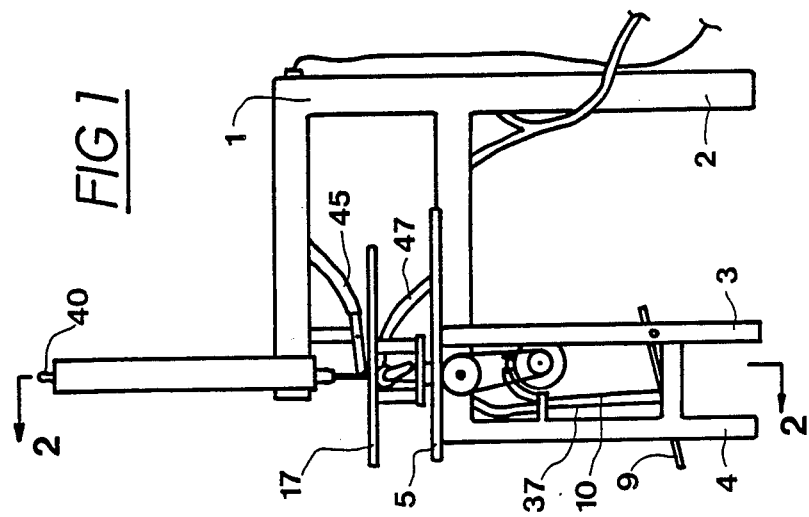
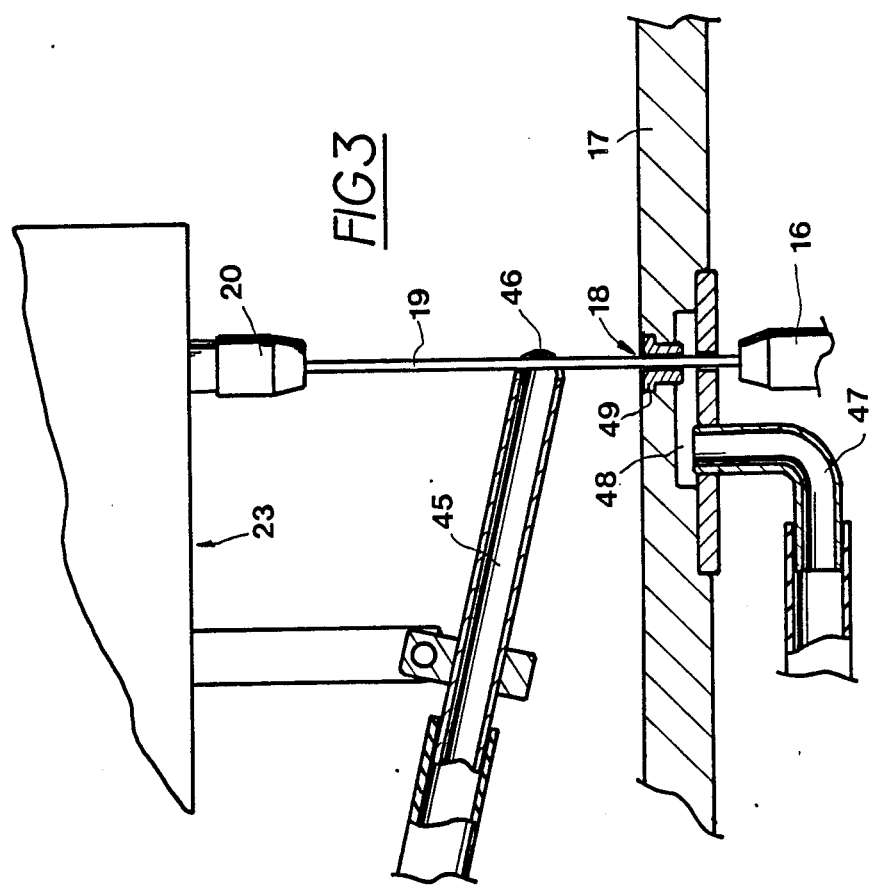

MOTORIZED SCROLL SAW

This invention relates to a motorized scroll-saw, of the kind that is suitable for use by a professional or amateur craftsman for cutting an intricate artistic design in a sheet of wood.

Such designs consist of an outline and a number of internal shapes. It is necessary when cutting an internal shape to pre-drill a hole through the wood somewhere within the proposed outline of the internal shape, and to feed the saw blade through the hole. Naturally, at least one end of the blade has to be disconnected from the machine when this is being done.

So long as the number of internal shapes to be cut is quite small, the craftsman is not too concerned with how long it takes to disconnect and re-connect the saw-blade. But when the design includes dozens, or perhaps hundreds, of internal shapes to be cut, the need for a quick-change facility becomes very strong.

In the kind of motorized scroll saw to which the invention generally relates, the motor operates to pull down the lower end of the saw blade. The saw blade rises under the action of a spring or other tensioning means, which maintains a constant upwards tension on the blade.

In this kind of motorized scroll saw, it is recognized in the invention that the most effective sequence of operations to use when feeding the blade out of one (finished) internal shape and into the pre-drilled hole of the next shape is as follows:

1. Switch off the saw motor.
2. When the blade comes to rest, press downwards on the upper blade-clamp, until the blade is relieved of the spring tension.
3. Unclamp the blade from the lower blade-clamp, by engaging a de-clamping tool (usually a wrench) onto the lower blade-clamp.
4. Keeping control of the upper blade-clamp, allow the blade to rise upwards out of the hole.
5. Re-position the work (ie. the sheet of wood) so that the next pre-drilled hole is aligned directly below the (unclamped) lower end of the saw-blade.
6. Press downwards on the upper blade-clamp, to lower the blade through the new hole.
7. Re-clamp the blade to the lower blade-clamp.
8. Re-start the motor.

Some kinds of scroll-saw require a somewhat different technique: the above is an example of a typical sequence of events. It is recognized in the invention that one of the problems of this procedure is this, that both hands are generally employed by the craftsman, when he is making cuts, in carefully moving the work in relation to the saw, and it is a considerable disruption to the smooth flow of work to take both hands away to attend to the above operations.

GENERAL DESCRIPTION OF THE INVENTION

In the invention, a pedal is provided for the purpose of relieving the craftsman's hands of a number of the above operations.

When he has completed an internal shape and wishes to proceed to the next shape, the craftsman operates the pedal. The first portion of the movement of the pedal away from its at-rest position is effective to disconnect the motor. When the motor is disconnected, the blade and the two blade clamps—the blade assembly—rise upwards under the action of the spring.

The next portion of the movement of the pedal is arranged to be effective to move a shoe downwards into contact with the upper blade-clamp, and then to move the shoe down a little further to take the spring-induced tension out of the blade. Now, a hand-operation is called for in that the craftsman uses one of his hands to unclamp the lower blade-clamp.

Having released the bottom end of the blade, the craftsman eases off on the pedal, which causes the shoe to retract upwards. This allows the blade to rise up and to clear the internal shape that has just been cut. Both hands are free at this point, so the craftsman has no difficulty in positioning the work so that the pre-drilled hole of the next internal shape is aligned with the lower end of the lade.

The craftsman depresses the pedal once more, which causes the shoe to push down on the upper blade-clamp, and he feeds the lower end of the saw through the pre-drilled hole. Both hands are free, so there is no difficulty over this, even if the hole is hardly bigger than the cross-section of the saw.

The craftsman aligns the saw with the lower blade-clamp, and again uses his hand, this time to tighten the lower blade-clamp. He now releases the pedal, which first causes the shoe to retract upwards, clear of the upper blade-clamp, and then reconnects the motor.

It is this sequence of operations of the pedal, as described above, which is recognized in the invention as allowing the "hole-change" time to be considerably reduced. The result is that, with the invention, the craftsman need have no concern about undertaking the task of making artistic designs that have myriads of internal shapes.

As regards the motor disconnecting action of the pedal, it is important that the motor be not merely switched off electrically. An electric motor has considerable inertia, and takes several seconds to come to rest. Also, when the motor is merely switched off, one cannot predetermine what point the blade will be at when it finally comes to rest. Preferably, therefore, the motor disconnecting means comprises a clutch. With a clutch, the blade stops virtually instantly, and, the blade being free of the motor, the blade-stopped position can be left to be set by the blade tensioning spring.

DETAILED DESCRIPTION OF A PREFERRED EMBODIMENT OF THE INVENTION

An example of a scroll-saw that has been constructed so as to incorporate the invention will now be described with reference to the accompanying drawings, in which:

FIG. 1 is a side elevation of the exemplary scroll-saw;

FIG. 3 is a close-up detail of a portion of the scroll-saw.

Figure 2:
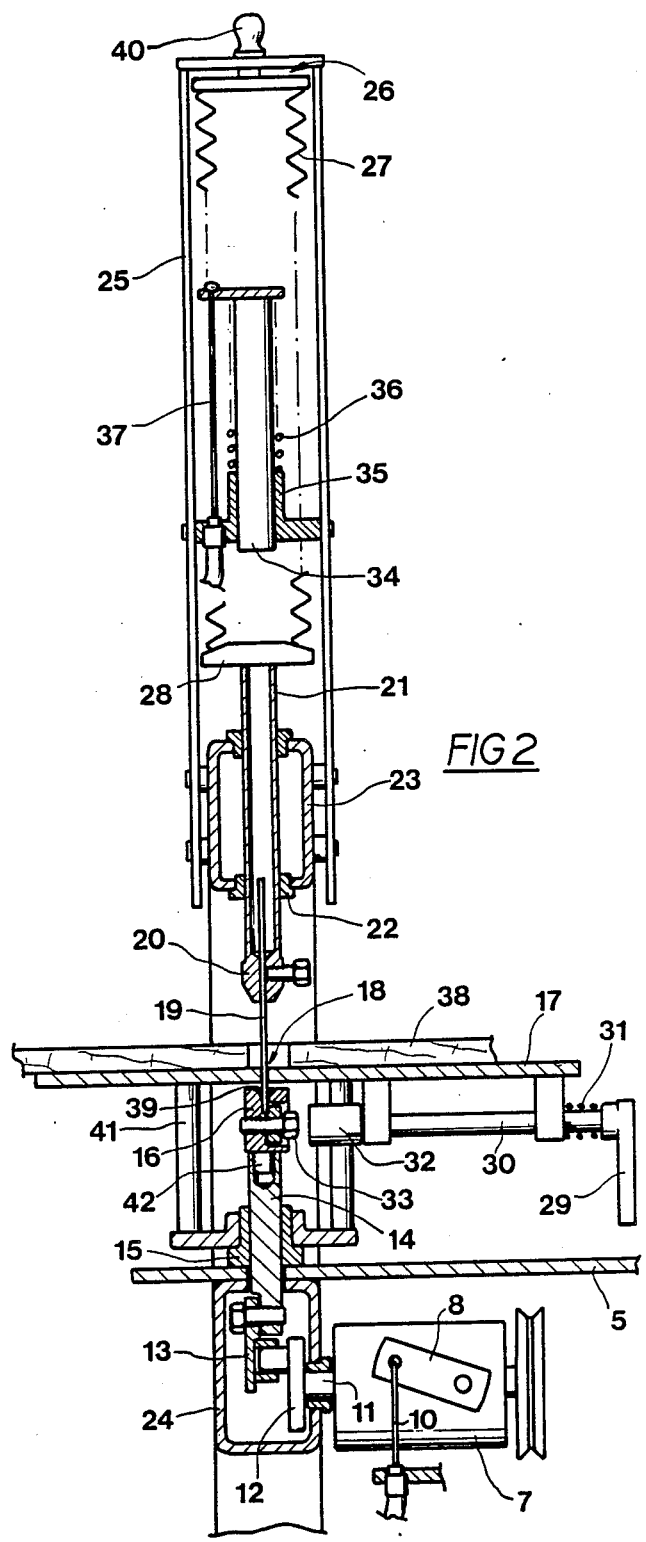
FIG. 2 is a cross-section of the line 2—2 of FIG. 1.

The scroll saw of the Figures includes a C-shaped frame 1. The frame 1 is provided with three legs 2,3,4 and a bench-top 5. The components of the frame 1 are manufactured from rectangular-section steel tubing.

An electric motor 6 is mounted underneath the bench-top 5, and drives a clutch 7. The clutch 7 is operated by means of a lever 8, which is under the control of the craftsman, by means of a foot-pedal 9 and a control-cable 10.

The output shaft 11 of the clutch 7 is connected via a crank 12 to a connecting rod 13, which serves to drive a piston-rod 14. The piston 14 is guided in lower guide-bearings 15 for up/down reciprocation. The piston 14 carries the lower blade-clamp 16.

A work-table 17 is provided with a hole 18, through which a saw-blade 19 is passed. The saw-blade 19 is clamped both to the lower blade-clamp 16 and to an upper blade-clamp 20, to form a blade assembly. The upper blade-clamp 20 is unitary with an upper piston-rod 21, which runs in upper guide bearings 22. The upper blade-clamp 20 is hollow, which allows the saw-blade 19 to be cut off to a longer length than necessary to bridge the distance between the two blade-clamps. This makes for economical use of the blade material since when the blade breaks it generally does so at the point where the blade enters the lower blade-clamp.

The C-shaped frame 1 includes upper 23 and lower 24 arms, which support the respective guide-bearings 15,22. The upper arm 23 is provided with extensions 25, which are unitary with the upper arm 23. A bridge 26 connects the tops of the extensions 25. Two springs 27 extend downwards from the bridge 26. The springs 27 are coupled to a yoke 28 which is unitary with the upper piston 21.

When the motor 6 is running, and the clutch 7 connected normally, the crank 12 drives the blade-assembly up and down. The blade 19 is kept in a constant state of tension by means of the springs 27. Of course, it is arranged that the reciprocating blade assembly may travel over its full stroke without striking the guide-bearings 15, 22, nor anything else.

In order to allow the craftsman to un-clamp the blade 19 from the lower clamp-assembly 16, a handle 29 is provided. The handle 29 is unitary with a shaft 30, which is mounted in bearings under the work-table 17. The shaft 30 is urged by a spring 31 to the right (FIG. 2) but may be moved to the left by the craftsman pushing the handle 29 to the left. The shaft 30 carries a bolt-driver 32, which is engageable, when the shaft 30 is moved to the left, with the clamp-bolt 33 of the lower blade-clamp 16.

When the clutch-lever 8 is operated, the motor drive is disconnected from the blade assembly. It is arranged that the springs 27 are powerful enough, when the clutch is operated, to pull the blade-assembly to the top-dead-centre position of the crank 12. It is arranged that at this point, the bolt-driver 32 is aligned with the clamp-bolt 33.

However, if the saw blade 19 were to be released from the lower blade-clamp 16, the saw-blade 19, and the upper blade clamp 20, the upper piston-rod 21, and the yoke 28, would all shoot upwards uncontrollably under the action of the springs 27. To prevent this happening, a shoe 34 is provided.

The shoe 34 is guided for up/down movement in shoe-bearings 35, which are mounted between the extensions 25. A spring 36 keeps the shoe 34 normally up, where the shoe 34 cannot touch the yoke 28 during reciprocation of the blade assembly. The shoe 34 may be drawn downwards by means of a shoe-cable 37, which is operable, as was the clutch-cable 10, by the pedal 9.

When the blade 19 is to be withdrawn, therefore, the shoe 34 may be used to control the vertical position of the blade assembly. Thus, before releasing the blade 19 from the lower blade-clamp 16, the craftsman presses the pedal 9, which brings the shoe 34 down into contact with the yoke 28. The craftsman should lower the shoe 34 just enough to take the tension out of the blade 19—any further lowering of the shoe 34 beyond that point could cause the blade 19 to buckle.

Once the blade has been released from the lower blade-clamp 16, the craftsman can ease up on the pedal, which will allow the blade 19 to rise out of the hole 18 and clear of the work 38, which is resting on the work-table 17. The work can now be manipulated so that the next pre-drilled hole is aligned with the hole 18, and ready to receive the saw-blade 19. It will be noted that the craftsman has both hands free to attend to this manipulation.

Once the work 38 is re-aligned, the craftsman can depress the pedal 9 again, and re-clamp the blade 19 to the bottom blade-clamp 16. The clamp 16 is provided with a chamfer 39 to ease the entry of the blade into the clamp 16. With the bladere-clamped to the lower blade-clamp 16, the craftsman can allow the pedal to rise, whereupon the shoe 34 rises clear of the yolk 28. Final release of the pedal 9 causes the clutch 7 to re-engage the drive from the motor 6 to the crank 12.

As shown in FIGS. 1 & 2, the teeth of the saw-blade 19 face away from the throat of the C-shaped frame 1. Sometimes however, it is required for the teeth to lie at 90 degrees to the throat. The blade and associated components are therefore constructed so that rotation can take place. The bridge 26 is provided with a rotary handle 40, by which the springs 27 may be rotated through 90 degrees. The work-table 17 is also rotatable, being supported on the pillar structure 41. The lower blade-clamp 16 is rotatable relative to the lower piston-rod 14 by virtue of the screw thread connection 42 between them.

The springs 27, as illustrated, are long. The extensions 25 themselves are long to accommodate the length of the springs 27. The reason the springs are so long is that the springs need to have a very low rate; or in other words, the tension exerted by the springs at the end of their working stroke condition should not be very much different from the tension of the springs at the start of their working stroke. The longer a spring, the lower its spring rate.

The greatest extension of the springs 27—i.e. the end of their working stroke—occurs when the saw-blade is at bottom-dead-centre of the crank 12. The springs are required to exert an upward force on the blade, however, at a position well-above the top-dead-centre position of the crank, since the springs are required to pull the blade up above the work-table 17 and the work 38.

It will be noted that the travel of the pedal 9 must be sufficient to allow the blade to rise fully clear of the work without the clutch being re-engaged. (There is no safety problem here. Even if the clutch were to be re-engaged accidentally while the blade is disconnected, only the lower blade-clamp 16 would start to move—and the lower blade-clamp is underneath the work-table 17 and well clear of the craftsman's hands.)

Preferably, a vacuum source is provided as part of the scroll-saw, for the purpose of extracting saw-dust from the cutting area. FIG. 3 shows how the vacuum facility is arranged in the exemplary embodiment.

An upper vacuum-tube 45 is attached to the upper arm 23 of the frame 1. The upper vacuum-tube 45 is provided with a V-shaped end 46, which acts to constrain and guide the saw-blade 19 to some extent.

A lower vacuum-tube 47 is coupled to a cavity 48 under the work-table 17. A tubular insert 49 serves to guide the saw-blade 19 below the work-table 17.

I claim:

1. Scroll saw, comprising:
a work-table, having a through-hole;
a scroll-saw blade, which is adapted to pass through the hole in the work-table;
upper and lower blade-clamps, located respectively above and below the work-table, the blade being clamped between the two clamps to form a blade-assembly;
a guide-means, which is arranged to guide the blade-assembly for up/down reciprocating movement;
a power-operated motor-means, which is arranged to urge the blade-assembly to move in cyclic reciprocation;
An operable motor-disconnecting-means, which is effective, when operated, to prevent the motor-means from moving the blade-assembly;
a shoe;
a shoe-guide means, which is arranged to guide the shoe for up and down movement, over a sufficient range that, when the shoe is down, the shoe may contact the upper blade-clamp, and when the shoe is up the shoe cannot contact the upper blade-clamp;
an operable shoe-moving-means, which is effective, when operated, to move the shoe downwards a sufficient distance to bring the shoe into contact with the upper blade-clamp;
a manually operable pedal, which is movable from an at-rest position;
where, when the pedal is operated, a first portion of the movement of the pedal away from the at-rest position is effective to operate the motor-disconnecting-means, and a later portion of the movement of the pedal away from the at-rest position is effective to operate the shoe-moving-means.

2. Saw of claim 1, which comprises a fixed, non-reciprocating, frame;
where the guide-means comprises respective upper and lower guide-means, each of which is movable with respect to the fixed frame, and each of which is arranged to guide the respective blade-clamp in up/down reciprocating movement with respect to the fixed frame;
where the motor-means is arranged to pull the blade assembly downwards, and to allow the blade to move upwards in cyclic reciprocation;
and comprises also a spring, which is arranged to pull the blade assembly upwards with respect to the fixed frame throughout the period of the cyclic reciprocation.

3. Saw of claim 1, where the operable motor-disconnecting-means is a clutch.

4. Saw of claim 3, where, when the clutch is operated, the motor-means is mechanically disengaged and disconnected from the blade-assembly.

5. Saw of claim 3, which includes a remotely-operated clamping means;
where the clamping means comprises a wrench which is sized to fit a clamp bolt of the lower blade-clamp;
where the wrench is normally held out of engagement with the bolt, and is engageable with the bolt upon operation of a handle.

6. Saw of claim 4, which further comprises a means for guiding the wrench;
where the said means is effective to constrain the wrench against all modes of movement relative to the fixed frame, other than rotation of the wrench about its rotary axis, and other than an engaging and de-engaging movement of the wrench into and out of engagement with the clamp-bolt of the power blade-clamp, along the line of the said rotary axis.

* * * * *